May 17, 1960 R. P. PUTKOVICH ET AL 2,937,298
ELECTRICAL POWER SUPPLIES
Filed March 27, 1958
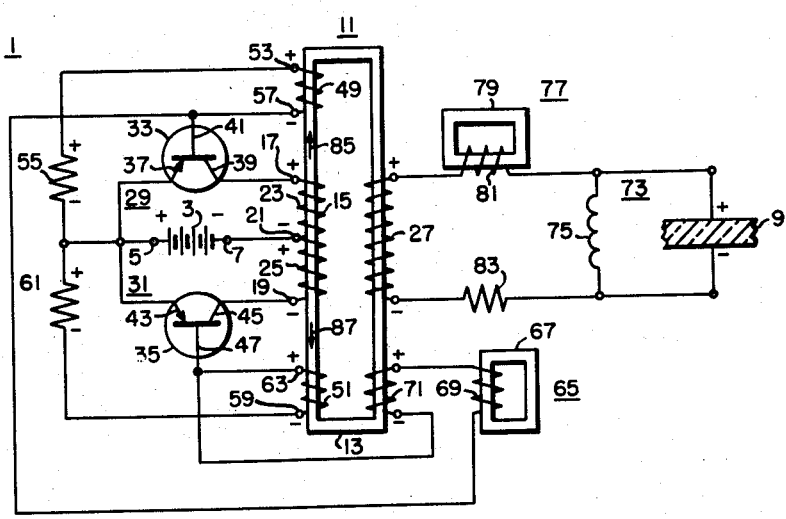
WITNESSES
Edwin E. Barber
James F. Young
INVENTORS
Rudy P. Putkovich &
Thomas M. Corry
BY
David M. Schiller
ATTORNEY

2,937,298

ELECTRICAL POWER SUPPLIES

Rudy P. Putkovitch, Franklin Township, Westmoreland County, and Thomas M. Corry, Monroeville, Pa., assignors to Westinghouse Electric Corporation, East Pittsburgh, Pa., a corporation of Pennsylvania Application March 27, 1958, Serial No. 724,410

20 Claims. (Cl. 313—108)

This invention relates to electrical power supplies and has particular relation to a power supply for supplying alternating current power to highly reactive loads exhibiting low power factors.

In systems wherein alternating current power is supplied to highly reactive loads the power supply must necessarily have a relatively large voltage-ampere rating as compared to the real power requirements of the load. Heretofore rotating generator machines have been employed for this purpose. These machines have been quite inefficient and costly due to the large voltage-ampere rating required of such machines.

In the present invention, a static alternating current power supply or oscillator of improved construction is provided for supplying alternating current power to highly reactive loads. The power supply is arranged for energization from a suitable source of direct voltage to supply an alternating voltage output. The power supply of the present invention is particularly suited for supplying power at maximum efficiency to highly reactive loads such as loads which exhibit capacitive and inductive reactance.

According to the present invention, a power supply is provided for supplying alternating current power to a load device consisting of electroluminescent means capable of emitting light when energized in accordance with an alternating voltage. The electroluminescent means may conveniently be in the form of one or more panels comprising a layer of suitable phosphor material located intermediate a pair of spaced electroconductive layers across which the alternating voltage is applied. It has been observed that such electroluminescent means exhibits a capacitive reactance and therefore constitutes a highly reactive load of low power factor.

In a preferred embodiment of the invention, the power supply includes inverter means having one or more switch devices in the form of transistors which are operable to switch a source of direct voltage across the primary winding of a transformer such that an alternating voltage output appears across the secondary winding of the transformer. The electroluminescent means is connected across the secondary winding for energization in accordance with the voltage appearing thereacross.

In the present invention operation of the system is such that the power dissipation in the transistors is maintained at a minimum value. For this purpose, control means is provided which is effective to permit energization of the load from the alternating voltage only at preselected times of each cycle of this voltage such that current passed by the conducting transistor during the switching on transient is at a minimum level. The control means is further arranged such that current required from the alternating voltage to charge the electroluminescent means is a minimum.

Additional control means are arranged to effect switching of the transistors only at such times when minimum current flows in the secondary circuit whereby current passed by the conducting transistor is a minimum during the switching off transient.

In a preferred embodiment of the invention, the control means includes a capacitive-inductive resonant circuit which is connected across the secondary winding of the transformer. The load device conveniently constitutes the capacitive portion of the resonant circuit. In order to provide minimum dissipation in the transistor switches, the control means includes additionally a saturable control reactor connected to permit energization of the load device at such times when the current required from the alternating voltage to charge the load device is at a minimum level. A saturable switching reactor is also provided to effect switching of the transistors only at such times when the current supplied by the output voltage to the resonant circuit is at a minimum level.

In order to supply biasing voltages to the switching transistors for maintaining the switched conditions, the transformer is provided with bias windings which are connected to the transistors to apply thereto voltages induced in the bias windings in response to energization of the primary winding. The bias windings are connected in a series circuit including the switching reactor and a pair of control resistors which serve to bias the transistors in response to saturation of the switching reactor.

It is therefore an object of the invention to provide a power supply of improved construction for supplying alternating current power to highly reactive load devices.

It is another object of the invention to provide a power supply of improved construction for supplying from a source of direct voltage alternating current power to reactive load devices which is of static construction free from moving parts.

It is a further object of the invention to provide an alternating current power supply employing switching transistors with means for maintaining the power dissipation in the transistors at a minimum level during operation of the power supply.

It is still another object of the invention to provide a power supply of improved construction for supplying alternating current power to electroluminescent means which exhibit a capacitive-reactance.

It is a still further object of the invention to provide a power supply system including inverter means for deriving from a source of direct voltage an alternating voltage which energizes a load with control means permitting energization of said load from said voltage only at preselected times during each cycle of said voltage.

Other objects of the invention will become apparent from the following description taken in conjunction with the accompanying drawing, in which the single figure is a circuit diagram illustrating an alternating current power supply constructed in accordance with the invention for supplying power to a capacitive load device.

Referring to the drawing, there is illustrated in the single figure a power supply represented generally by the numeral 1 embodying the teachings of the present invention. The power supply 1 includes a source of unidirectional voltage which is represented by the battery 3 for providing a unidirectional input quantity which is to be inverted to an alternating voltage output quantity. The battery 3 is illustrated as having a positive terminal 5 and a negative terminal 7.

A suitable load device 9 is shown in association with the power supply 1 for energization in accordance with the alternating output quantity of the supply 1. The supply 1 is particularly suited for supplying power to highly reactive load devices. In the single figure the load device 9 is illustrated as comprising electroluminescent means capable of emitting light when energized in accordance with an alternating voltage. Such electroluminescent means may be in the form of one or more panels comprising a layer of a suitable phosphor material intermediate a pair of spaced layers of electroconductive material across which the alternating voltage is applied. For example, the following construction may be utilized. A pane of glass may be coated with a transparent electroconductive material. On this conductive coating may be placed a mixture of phosphor powder in a suitable plastic binder. Finally, a film of aluminum may be evaporated on the phosphor layer. When alternating voltage is applied across a panel so constructed, it is observed that the phosphor emits light.

It has been further observed that electroluminescent means as above-described constitutes in effect a condenser with the result that it exhibits a capacitive reactance having a low power factor. Although the invention is applicable to any type of capacitive load device, it will be described in connection with a load device in the form of electroluminescent means as above-described.

The power supply 1 includes inverter means which may include a transformer 11 having a magnetic core 13 constructed of any suitable magnetic material such as silicon steel. In order to permit magnetization of the core 13 the transformer 11 includes primary winding means 15 having end terminals 17 and 19 with an intermediate center tap connection 21. The center tap connection divides the winding means 15 into two sections 23 and 25. A secondary winding 27 also links the core 13 in inductive relation with the winding means 15 for supplying an alternating voltage to the load device 9.

In order to permit energization of the winding means 15 in accordance with voltage of the source 3 for causing the induction of an alternating voltage in the winding 27, one or more current paths may be provided to connect the winding means 15 for energization from the source 3. For this purpose, a pair of paths 29 and 31 are connected in parallel relation with each other with the winding section 23 included in the path 29 and with the winding section 25 included in the path 31. With this arrangement, the sections 23 and 25 are connected to be energized from the source 3 in opposing directions.

In order to control energization of the winding means 15 from the source 3, a pair of switch devices 33 and 35 are provided in association respectively with the paths 29 and 31. The switch devices are preferably in the form of three-electrode junction transistor devices. In Fig. 1 the transistors are illustrated in the form of p-n-p transistors with the transistor 33 having an emitter electrode 37, a collector elemtrode 39 and a base electrode 41. In a similar manner, the transistor 35 includes an emitter electrode 43, a collector electrode 45 and a base electrode 47. If desired, transistors of the n-p-n type may be employed in place of the illustrated p-n-p transistors.

In the present invention, the transistors are biased to operate as controlled switch devices so that each transistor has a closed operating condition wherein the transistor exhibits a very low impedance between the emitter and collector electrodes, and an open operating condition wherein the transistor exhibits a very high impedance between the emitter and collector electrodes. Further details regarding the operation of transistors as controlled switch devices may be found in U.S. Patent No. 2,783,384 assigned to the assignee of the present invention.

As illustrated in the single figure, the emitter electrode 37 of the transistor 33 is connected in the path 29 to the positive terminal 5 of the source 3 whereas the collector electrode 39 is connected in the path 29 to the terminal 17 of the winding section 23. The center tap connection 21 is connected to the negative terminal 7 of the source 3. In a similar manner, the emitter electrode 43 of the transistor 35 is connected in the path 31 to the terminal 5 whereas the collector electrode 45 is connected to the terminal 19.

In order to control operation of the transistors 33 and 35, suitable biasing means are provided to apply bias voltages to the transistors. In the drawing such biasing means are illustrated in the form of windings 49 and 51 which link the core 13 in inductive relation with the winding 15.

The windings 49 and 51 are connected to apply voltages induced therein in response to energization of the winding 15 to the transistors to establish opposing conducting conditions of the transistors. To this end the windings 49 and 51 are connected between the emitter and base electrodes of the transistors to apply voltages of opposing polarity between these electrodes. As illustrated, the winding 49 has a terminal 53 connected through a resistor 55 to the emitter electrode 37 of the transistor 33. The other terminal 57 of the winding 49 is connected to the base electrode 41 of the transistor 33. In a similar manner a terminal 59 of the winding 51 is connected to the emitter electrode 43 through a resistor 61 with the terminal 63 connected to the base electrode 47.

In a preferred embodiment of the invention means independent of the windings 49 and 51 are employed to effect switching of the transistors 33 and 35. With this arrangement the windings 49 and 51 operate only to maintain the switched conditions of the transistors and do not function to effect the switching action.

The switching means preferably includes a saturable reactor 65 having a magnetic core 67 preferably constructed of material which exhibits substantially rectangular hysteresis loop characteristics. A winding 69 links the core 67 and is connected in series circuit relation with a winding 71 linking the core 13 and with the windings 49 and 51 and the resistors 55 and 61. It is noted that a point intermediate the resistors 55 and 61 is connected to the emitter electrodes of the transistors. Operation of the switching means will be described hereinafter.

In order to permit control of the switching of the transistors the invention provides control means connected for energization from the winding 27 in accordance with voltage induced therein. In the embodiment illustrated, such control means includes a resonant circuit 73 connected across the winding 27 for energization by current resulting from voltage induced in the winding 27.

According to the present invention, the load device 9 constitutes a portion of the circuit 73. It will be recalled that the device 9 may be in the form of electroluminescent means which exhibits a capacitive reactance. A linear inductance 75 constitutes the remaining portion of the circuit 73 and is connected in parallel circuit relation with the device 9.

In order to minimize power dissipation in the transistors during operation of the system, the invention provides additional control means 77 for controlling energization of the device 9. The control means 77 is preferably in the form of a saturable control reactor having a magnetic core 79 preferably constructed of material which exhibits substantially rectangular hysteresis loop characteristics. A winding 81 links the core 79 in series circuit relation with the winding 27 and the circuit 73. A resistor 83 may be included in this series circuit to limit the value of current flowing in this circuit when the core 79 is saturated as will be described hereinafter.

As will presently appear, very low power dissipation in the transistors is realized by the provision of the reactor 77. In addition, minimum power dissipation in the transistors results with the reactor 77 designed such that the time required for the core 79 to transfer between opposing directions of saturation is substantially equal to the time of one half cycle of the resonant frequency of the circuit 73.

Operation of the circuit 1 will now be described according to the present understanding of the invention. When the source 3 is connected in the circuit 1 one or the other of the transistors 33 and 35 will assume a conducting condition. For purposes of discussion it will be assumed that the transistor 33 is initially in a conducting condition.

With this assumption then a substantial portion of current from the source 3 will flow from the terminal 5 through the emitter electrode 37, the collector electrode 39 and the winding section 23 back to the terminal 7. Such current flow through the section 23 establishes a magnetomotive force which directs magnetic flux through the core 13 in the direction of the arrow 85. Such flux flow is effective to induce voltages in the windings 15, 27, 49, 51 and 71 having polarities as indicated by the associated plus and minus signs.

The voltages so induced in the windings 49 and 51 have magnitudes and polarities effective to maintain respectively conductive and non-conductive conditions of the transistors 33 and 35. The voltage induced in the winding 71 at this time produces current which flows through the series circuit consisting of the windings 71, 69, 49 and 51 and the resistors 55 and 61. If it be assumed that the core 67 is initially in an unsaturated condition then the impedance presented to this current by the winding 69 is very large with the result that substantially all of the voltage induced in the winding 71 appears across the winding 69. As will appear hereinafter when the core 67 attains a saturated condition, a substantial portion of the voltage induced in winding 71 will appear across the resistors 55 and 61. These voltages will be effective to switch the transistors to opposing conducting conditions.

Voltage induced in the winding 27 with polarity as shown causes current to flow through the circuit including the winding 81, the circuit 73 and the resistor 83. If it be assumed that the core 79 of the reactor 77 is initially in an unsaturated condition then the impedance presented by the winding 81 to this current is very large with the result that substantially all of the voltage induced in winding 27 appears across winding 81. This is a very advantageous arrangement since during the interval that the core 79 is proceeding toward saturation, the conducting transistor 33 need only pass the current required by the magnetic elements in the circuit and the base circuits of the transistors.

When the core 79 attains a saturated condition the impedance presented by the winding 81 to current flow is considerably reduced with the result that a substantial portion of voltage induced in the winding 27 is applied across the circuit 73. When this occurs, a portion of the current from the winding 27 flows to charge the load device 9. A smaller portion of this current flows through the inductance 75. The current from the winding 27 is limited to an acceptable value by the resistor 83. As the load device 9 charges, the charging current required decreases and consequently, current through the inductance 75 increases. At some time in this charging cycle the current from the winding 27 attains a minimum value. At this particular time the conducting transistor 33 is passing a minimum current.

In order to realize minimum power dissipation during a switching transient, the invention provides that the conducting transistor is switched to a non-conducting condition substantially at the time when current passing through the conducting transistor is at a minimum value. For this purpose the reactor 65 and the circuit 73 are designed such that the core 67 of the reactor 65 saturates substantially at the time when current derived from voltage induced in the winding 27 is at a minimum value.

When the core 67 saturates the impedance presented by the winding 69 is reduced to a low value whereby substantially all of the voltage induced in winding 71 appears across the resistors 55 and 61. These voltages have polarities as indicated by the associated plus and minus signs. The polarities and magnitudes of these voltages are such as to switch the transistors for establishing a non-conducting condition of the transistor 33 and a conducting condition of the transistor 35.

As the transistor 35 begins to conduct, current flows from the terminal 5 through the emitter electrode 43, the collector electrode 45 and the winding section 25. Such current flow through the winding section 25 establishes a magnetomotive force which directs magnetic flux through the core 13 in the direction of the arrow 87. Such flux flow is effective to induce voltages in the windings 15, 27, 49, 51 and 71 having polarities opposite to the polarities illustrated.

Inasmuch as the polarity of voltage induced in winding 27 has reversed, the core 79 of the reactor 77 is magnetized in the direction opposite to the direction of magnetization thereof for a conducting condition of transistor 33. During such magnetization of the core 79 the previously charged load device 9 is discharged through the inductance 75 at a rate determined by the resonant frequency of the circuit 73. At the completion of one half cycle of the resonant frequency of circuit 73 subsequent to the switching operation, the discharge current has decreased to zero whereas the voltage across device 9 has increased in the reversed direction and has the same polarity as voltage induced in winding 27.

In the present invention, the arrangement is such that current required from voltage induced in the winding 27 to charge the load device 9 is a minimum. To this end the reactor 77 and the circuit 73 are designed such that the time required for the core 79 of the reactor 77 to transfer between opposing directions of saturation is substantially equal to the time required for completion of one half cycle of the resonant frequency of the circuit 73. With this arrangement, the core 79 will saturate when the voltage across the device 9 is of the same polarity as the voltage induced in winding 27. This results in the supply of a minimum current from such induced voltage to charge the device 9.

Subsequent to saturation of the core 79, the current supplied by voltage induced in the winding 27 will decrease to a minimum value. When this occurs the core 67 of the reactor 65 will saturate as explained previously to establish voltages across the resistors 55 and 61 having polarities opposite to those illustrated. These voltages are effective to operate the transistors for establishing a conducting condition of the transistor 33 and a non-conducting condition of the transistor 35. The above-described sequence of events is then repeated.

The result of such operation is the production of an alternating voltage across the winding 27 which has a substantially rectangular wave pattern. A sine wave voltage appears across the device 9 due to the series connection of the device 9, the reactor 77 and the winding 27.

As pointed out in the previously referred to patent the frequency of the voltage across the winding 27 is proportional to the frequency of reversal of the operating conditions of the transistors 33 and 35. This frequency of reversal is in turn dependent upon the time required for the core 67 to transfer between opposing directions of saturation. Consequently, the frequency of voltage across winding 27 may be varied by adjusting the number of turns of the winding 69 or by altering the voltage applied across such winding.

By means of the invention, the transistors are operated at times when the currents passed thereby are at minimum levels thereby providing minimum dissipation in the transistors during the switching transients. Electroluminescent panels have been successfully energized from a circuit constructed in accordance with the invention at a frequency of approximately two thousand cycles per second and a voltage of about five hundred volts.

Although the invention has been described with reference to certain specific embodiments thereof, numerous modifications are possible and it is desired to cover all modifications falling within the spirit and scope of the invention.

We claim as our invention:

1. In an electrical system, a pair of terminals adapted to be energized from a source of direct input voltage, inverter means connected to said terminals for deriving from said source output voltages of opposite polarity and of substantially square shape, load means exhibiting a capacitive reactance, a discharge circuit for said load means, said load means being connected for energization by said output voltage, and control means initiated as a consequence of a reversal of said polarity of said output voltage for delaying the energization of said load means from said inverter means, said control means being effective to initiate charging of said load means only subsequent to the discharge of said load means so that the initial current required from said alternating voltage to charge said load means is at a reduced value.

2. In an electrical system, a pair of terminals adapted to be energized from a source of direct input voltage, inverter means connected to said terminals for deriving from said source an alternating voltage, said inverter means including switch means, a load device connected for energization in accordance with said alternating voltage, said load device comprising parallelly connected capacitive and inductance elements, and control means for controlling the operation of said switch means, said control means being effective to operate said switch means only at a time during each one-half cycle of said alternating voltage when the current passing through said switch means is substantially at a minimum value.

3. In an electrical system, a pair of terminals adapted to be energized from a source of direct input voltage, inverter means for deriving from said source an alternating voltage, said inverter means including switch means for controlling said polarities, a parallel circuit connected for energization by current resulting from said alternating voltage, said parallel circuit including a capacitive device and a device for discharging said capacitive device, first control means arranged to actuate said switch means to initiate charging of said capacitive device in a first polarity solely subsequent to a preselected time subsequent to operation of said switch means, said preselected time being not substantially less than the time required for said capacitive device to discharge through said discharging device whereby the initial current required from said alternating voltage to charge said capacitive device is at a minimum value, and second control means arranged to operate said switch means only at a time when the current resulting from said alternating voltage is at a minimum value.

4. In an electrical system, a pair of terminals adapted to be energized from a source of direct input voltage, inverter means connected to said terminals for deriving from said source an alternating voltage, said inverter means including transistor switch means, a resonant circuit connected for energization by current resulting from said alternating voltage, said resonant circuit including electroluminescent load means and an inductive element connected in parallel therewith, first control means arranged to initiate current flow to said electroluminescent load means a preselected time interval subsequent to operation of said switch means, said time interval being not substantially less than the time required to discharge said electroluminescent means through said inductive element whereby the current required from the alternating voltage to charge said load means is at a reduced value, and second control means arranged to operate said switch means from a fully conducting condition to a fully non-conducting condition at and only at a time when the current resulting from said alternating voltage is at a minimum value.

5. In an electrical network, inverter means having output terminal means, said inverter means being effective when energized from a source of direct voltage to produce across said output terminal means an alternating voltage, said inverter means including a pair of transistor switch devices for switching currents supplied by the source to the terminal means, a parallel circuit connected across said output terminal means for energization by current resulting from said alternating voltage, said parallel circuit including a capacitive device and an inductive discharge circuit for said capacitive device, first control means connected to said output terminal means to control energization of said capacitive device, said first control means being effective to delay charging of said capacitive device for a time interval following each reversal of the alternating voltage, and second control means responsive to said alternating voltage for operating said switch devices only at a time when the current resulting from said alternating voltage is at a minimum value.

6. In an electrical system, a pair of input terminals adapted to be energized from a source of direct input voltage, magnetic core means, a pair of electrical paths connected to said terminals for energization from said source for supplying to said core means magnetomotive forces acting in opposing directions, a pair of switch devices each included in a separate one of said paths, each of said switch devices being operable to transfer the associated path between a conductive condition and a substantially non-conductive condition, control means for controlling operation of said switch devices, said control means including switch operating means effective a preselected time subsequent to the establishment of a conductive condition of one of said paths and a non-conductive condition of the other of said paths to operate said switch devices for reversing the conductive conditions of said paths, said switch operating means being additionally effective a preselected time subsequent to the establishment of a conductive condition of said other path and a non-conductive condition of said one path to operate said switch devices for reversing the conductive conditions of said paths, output winding means linking said core means having alternating voltage induced therein in response to operation of said switch devices, and a resonant circuit connected across said output winding means for energization by current resulting from said induced voltage, said resonant circuit including parallel-connected inductive and capacitive elements, said current having a magnitude which varies from a maximum to a minimum during charging of said capacitive element, said resonant circuit and said switch operating means being arranged such that said minimum current magnitude occurs at said preselected time whereby said switch devices are operated at the time of occurrence of said minimum current magnitude.

7. In an electrical system, a pair of input terminals adapted to be energized from a source of direct input voltage, first magnetic core means, a pair of electrical paths connected to said terminals for energization from said source for supplying to said first core means magnetomotive forces acting in opposing directions, a pair of switch devices each included in a separate one of said paths, each of said switch devices being operable to transfer the associated path between a conductive condition and a substantially non-conductive condition, control means for controlling operation of said switch devices, said control means including switch operating means effective a preselected time subsequent to the establishment of a conductive condition of one of said paths and a non-conductive condition of the other of said paths to operate said switch devices for reversing the conductive conditions of said paths, said switch operating means being additionally effective a preselected time subsequent to the establishment of a conductive condition of said other path and a non-conductive condition of said one path to operate said switch devices for reversing the conductive conditions of said paths, output winding means linking said first core means having alternating voltage induced therein in response to operation of said switch devices, a resonant circuit connected across said output winding means for energization by current resulting from said induced voltage, said resonant circuit including parallel-connected inductive and capacitive elements, and reactor means including second magnetic core means and input winding means linking said second core means, said input winding means being connected in series relation with said resonant circuit and said output winding means for energization by said current, said second core means being designed for magnetic saturation within the range of energization of said input winding means.

8. In an electrical system, a pair of input terminals adapted to be energized from a source of direct input voltage, first magnetic core means, a pair of electrical paths connected to said terminals for energization from said source for supplying to said first core means magnetomotive forces acting in opposing directions, a pair of switch devices each included in a separate one of said paths, each of said switch devices being operable to transfer the associated path between a conductive condition and a substantially non-conductive condition, control means for controlling operation of said switch devices, said control means including switch operating means effective a preselected time subsequent to the establishment of a conductive condition of one of said paths and a non-conductive condition of the other of said paths to operate said switch devices for reversing the conductive conditions of said paths, switch operating means being additionally effective a preselected time subsequent to the establishment of a conductive condition of said other path and a non-conductive condition of said one path to operate said switch devices for reversing the conductive conditions of said paths, output winding means linking said first core means having alternating voltage induced therein in response to operation of said switch devices, a resonant circuit connected across said output winding means for energization by current resulting from said induced voltage, said resonant circuit including parallel-connected inductive and capacitive elements, and reactor means including second magnetic core means and input winding means linking said second core means, said input winding means being connected in series relation with said resonant circuit and said output winding means for energization by said current, said second core means being designed for magnetic saturation within the range of energization of said input winding means, said reactor means and said resonant circuit being arranged such that the time required for said second core means to transfer between opposing directions of saturation is substantially equal to the time of one-half cycle of the resonant frequency of said resonant circuit.

9. In an electrical system, a pair of input terminals adapted to be energized from a source of direct input voltage, first magnetic core means, a pair of electrical paths connected for energization from said source for supplying to said first core means magnetomotive forces acting in opposing directions, a pair of switch devices each included in a separate one of said paths, each of said switch devices being operable to transfer the associated path between a conductive condition and a substantially non-conductive condition, control means for controlling operation of said switch devices, said control means including switch operating means effective a preselected time subsequent to the establishment of a conductive condition of one of said paths and a non-conductive condition of the other of said paths to operate said switch devices for reversing the conductive conditions of said paths, said switch operating means being additionally effective a preselected time subsequent to the establishment of a conductive condition of said other path and a non-conductive condition of said one path to operate said switch devices for reversing the conductive conditions of said paths, output winding means linking said first core means having alternating voltage induced therein in response to operation of said switch devices, a resonant circuit connected across said output winding means for energization by current resulting from said induced voltage, said resonant circuit including parallel-connected inductive and capacitive elements, and reactor means including second magnetic core means and input winding means linking said second core means, said input winding means being connected in series relation with said resonant circuit and said output winding means for energization by said current, said second core means being designed for magnetic saturation within the range of energization of said input winding means, said reactor means and said resonant circuit being arranged such that the time required for said second core means to transfer between opposing directions of saturation is substantially equal to the time of one-half cycle of the resonant frequency of said resonant circuit, said current having a magnitude which varies from a maximum to a minimum during charging of said capacitive element, said resonant circuit and said switch operating means being arranged such that said minimum current magnitude occurs at said preselected time whereby said switch devices are operated at the time of occurrence of said minimum current magnitude.

10. In an electrical system, a pair of input terminals adapted to be energized from a source of direct input voltage, first magnetic core means, a pair of electrical paths connected to said terminals for energization from said source for supplying to said first core means magnetomotive forces acting in opposing directions, a pair of switch devices each included in a separate one of said paths, each of said switch devices being operable to transfer the associated path between a conductive condition and a substantially non-conductive condition, control means for controlling operation of said switch devices, said control means including switch operating means effective a preselected time subsequent to the establishment of a conductive condition of one of said paths and a non-conductive condition of the other of said paths to operate said switch devices for reversing the conductive conditions of said paths, said switch operating means being additionally effective a preselected time subsequent to the establishment of a conductive condition of said other path and a non-conductive condition of said one path to operate said switch devices for reversing the conductive conditions of said paths, output winding means linking said first core means having alternating voltage induced therein in response to operation of said switch devices, a resonant circuit connected across said output winding means for energization by current resulting from said induced voltage, said resonant circuit including parallel-connected inductive and capacitive elements, and reactor means including second magnetic core means and input winding means linking said second core means, said input winding means being connected in series relation with said resonant circuit and said output winding means for energization by said current, said second core means being designed for magnetic saturation within the range of energization of said input winding means, said reactor means and said resonant circuit being arranged such that the time required for said second core means to transfer between opposing directions of saturation is substantially equal to the time of one-half cycle of the resonant frequency of said resonant circuit, said current having a magnitude which varies from a maximum to a minimum during charging of said capacitive element, said resonant circuit and said switch operating means being arranged such that said minimum current magnitude occurs at said preselected time whereby said switch devices are operated at the time of occurrence of said minimum current magnitude, said capacitive element comprising electroluminescent means effective when energized in accordance with said induced voltage to emit light.

11. In an electrical system, a pair of terminals adapted to be energized from a source of direct input voltage, first magnetic core means, a pair of electrical paths connected to said terminals for energization from said source for supplying to said first core means magnetomotive forces acting in opposing directions, a pair of transistor devices each having emitter, collector and base electrodes, each of said paths including the emitter and collector electrodes of a separate one of said transistor devices, each of said devices being operable to transfer the associated path between a conductive condition and a substantially non-conductive condition, a pair of biasing windings linking said first core means, a pair of resistance elements, a separate one of said resistance elements and of said biasing windings being connected in series relation between the base and one of the emitter and collector electrodes of each device, said biasing windings being connected to apply bias voltages induced therein in response to a first conductive condition of said paths to said transistor devices for maintaining said first conductive condition, and to apply bias voltages induced therein in response to a second conductive condition of said paths opposite to said first condition to said transistor devices for maintaining said second condition, control winding means linking said first core means, reactor means including second magnetic core means and input winding means linking said second core means, said input winding means being connected in series relation with said control winding means and said resistance elements and said biasing windings for energization thereof in accordance with a control voltage induced in said control winding means, said second core means being designed for magnetic saturation within the range of energization of said input winding means, said resistance elements having voltages developed thereacross in response to saturation of said second core means produced by said first conductive condition effective to operate said transistor devices for establishing said second conductive condition, said resistance elements having additionally voltages developed thereacross in response to saturation of said second core means produced by said second condition effective to operate said transistor devices for establishing said first condition, output winding means linking said first core means having alternating voltage induced therein in response to operation of said transistor devices, and a resonant circuit connected across said output winding means for energization by current resulting from said induced voltage, said resonant circuit including parallel-connected inductive and capacitive elements, said current having a magnitude which varies from a maximum to a minimum during charging of said capacitive element, said resonant circuit and said reactor means being arranged such that said minimum current magnitude occurs at the time of saturation of said second core means whereby said transistor devices are operated at the time of occurrence of said minimum current magnitude.

12. In an electrical system, a pair of terminals adapted to be energized from a source of direct input voltage, first magnetic core means, a pair of electrical paths connected for energization from said source for supplying to said first core means magnetomotive forces acting in opposing directions, a pair of transistor devices each having emitter, collector and base electrodes, each of said paths including the emitter and collector electrodes of a separate one of said transistor devices, each of said devices being operable to transfer the associated path between a conductive condition and a substantially non-conductive condition, a pair of biasing windings linking said first core means, a pair of resistance elements, a separate one of said resistance elements and of said biasing windings being connected in series relation between the base and one of the emitter and collector electrodes of each device, said biasing windings being connected to apply bias voltages induced therein in response to a first conductive condition of said paths to said transistor devices for maintaining said first conductive condition, and to apply bias voltages induced therein in response to a second conductive condition of said paths opposite to said first condition to said transistor devices for maintaining said second condition, control winding means linking said first core means, first reactor means including second magnetic core means and first input winding means linking said second core means, said first input winding means being connected in series relation with said control winding means and said resistance elements and said biasing windings for energization in accordance with a control voltage induced in said control winding means, said second core means being designed for magnetic saturation within the range of energization of said first input winding means, said resistance elements having voltages developed thereacross in response to saturation of said second core means produced by said first conductive condition effective to operate said transistor devices for establishing said second conductive condition, said resistance elements having additionally voltages developed thereacross in response to saturation of said second core means produced by said second condition effective to operate said transistor devices for establishing said first condition, output winding means linking said first core means having alternating voltage induced therein in response to operation of said transistor devices, a resonant circuit connected across said output winding means for energization by current resulting from said induced voltage, said resonant circuit including parallel-connected inductive and capacitive elements, and second reactor means including third magnetic core means and second input winding means linking said third core means, said second input winding means being connected in series relation with said resonant circuit and said output winding means for energization by said current, said third core means being designed for magnetic saturation within the range of energization of said second input winding means, said second reactor means and said resonant circuit being arranged such that the time required for said third core means to transfer between opposing directions of saturation is substantially equal to the time of one-half cycle of the resonant frequency of said resonant circuit.

13. In an electrical system, a pair of terminals adapted to be energized from a source of direct input voltage, first magnetic core means, a pair of electrical paths connected to said terminals for energization from said source for supplying to said first core means magnetomotive forces acting in opposing directions, a pair of transistor devices each having emitter, collector and base electrodes, each of said paths including the emitter and collector electrodes of a separate one of said transistor devices, each of said devices being operable to transfer the associated path between a conductive condition and a substantially non-conductive condition, a pair of biasing windings linking said first core means, a pair of resistance elements, a separate one of said resistance elements and of said biasing windings being connected in series relation between the base and one of the emitter and collector electrodes of each device, said biasing windings being connected to apply bias voltages induced therein in response to a first conductive condition of said paths to said transistor devices for maintaining said first conductive condition, and to apply bias voltages induced therein in response to a second conductive condition of said paths opposite to said first condition to said transistor devices for maintaining said second condition, control winding means linking said first core means, first reactor means including second magnetic core means and first input winding means linking said second core means, said first input winding means being connected in series relation with said control winding means and said resistance elements and said biasing windings for energization in accordance with a control voltage induced in said control winding means, said second core means being designed for magnetic saturation within the range of energization of said first input winding means, said resistance elements having voltages developed thereacross in response to saturation of said second core means produced by said first conductive condition effective to operate said transistor devices for establishing said second conductive condition, said resistance elements having additionally voltages developed thereacross in response to saturation of said second core means produced by said second condition effective to operate said transistor devices for establishing said first condition, output winding means linking said first core means having alternating voltage induced therein in response to operation of said transistor devices, a resonant circuit connected across said output winding means for energization by current resulting from said induced voltage, said resonant circuit including parallel-connected inductive and capacitive elements, and second reactor means including third magnetic core means and second input winding means linking said third core means, said second input winding means being connected in series relation with said resonant circuit and said output winding means for energization by said current, said third core means being designed for magnetic saturation within the range of energization of said second input winding means, said second reactor means and said resonant circuit being arranged such that the time required for said third core means to transfer between opposing directions of saturation is substantially equal to the time of one-half cycle of the resonant frequency of said resonant circuit, said current having a magnitude which varies from a maximum to a minimum during charging of said capacitive element, said resonant circuit and said first reactor means being arranged such that said minimum current magnitude occurs substantially at the time of saturation of said second core means whereby said transistor devices are operated at the time of occurrence of said minimum current magnitude.

14. In an electrical system, a pair of terminals adapted to be energized from a source of direct input voltage, first magnetic core means, a pair of electrical paths connected to said terminals for energization from said source for supplying to said first core means magnetomotive forces acting in opposing directions, a pair of transistor devices each having emitter, collector and base electrodes, each of said paths including the emitter and collector electrodes of a separate one of said transistor devices, each of said transistor devices being operable to transfer the associated path between a conductive condition and a substantially non-conductive condition, a pair of biasing windings linking said first core means in inductive relation, a pair of resistance elements, a separate one of said resistance elements and of said biasing windings being connected in series relation between the base and one of the emitter and collector electrodes of each device, said biasing windings being connected to apply bias voltages induced therein in response to a first conductive condition of said paths to said transistor devices for maintaining said first conductive condition, and to apply bias voltages induced therein in response to a second conductive condition of said paths opposite to said first condition to said transistor device for maintaining said second condition, control winding means linking said first core means, first reactor means including second magnetic core means and first input winding means linking said second core means, said first input winding means being connected in series relation with said control winding means and said resistance elements and said biasing windings for energization in accordance with a control voltage induced in said control winding means, said second core means being designed for magnetic saturation within the range of energization of said first input winding means, said resistance elements having voltages developed thereacross in response to saturation of said second core means produced by said first conductive condition effective to operate said transistor devices for establishing said second conductive condition, said resistance elements having additionally voltages developed thereacross in response to saturation of said second core means produced by said second condition effective to operate said transistor devices for establishing said first condition, output winding means linking said first core means having alternating voltage induced therein in response to operation of said transistor devices, a resonant circuit connected across said output winding means for energization by current resulting from said induced voltage, said resonant circuit including parallel-connected inductive and capacitive elements, and second reactor means including third magnetic core means and second input winding means linking said third core means, said second input winding means being connected in series relation with said resonant circuit and said output winding means for energization by said current, said third core means being designed for magnetic saturation within the range of energization of said second input winding means, said second reactor means and said resonant circuit being arranged such that the time required for said third core means to transfer between opposing directions of saturation is substantially equal to the time of one-half cycle of the resonant frequency of said resonant circuit, said current having a magnitude which varies from a maximum to a minimum during charging of said capacitive element, said resonant circuit and said first reactor means being arranged such that said minimum current magnitude occurs substantially at the time of saturation of said second core means whereby said transistor devices are operated at the time of occurrence of said minimum current magnitude, said capacitive element comprising electroluminescent means effective when energized in accordance with said induced voltage to emit light.

15. In a load-energizing system, a switching device including a main current path and first control means operable for varying the resistance of the main current path continuously between a high value and a low value, an electrical load which comprises parallelly connected inductive and capacitive reactances providing an impedance to the flow of direct electrical current which varies in operation between a high value and a low value, said load being connected for energization through said main path by current having a minimum value, and circuit control means cooperating with the first control means for transferring said switching device promptly between said high and low values only when the current in said main path is of substantially less value.

16. In a load-energizing system a transistor switching device including a main current path and first control means operable for varying the resistance of the main current path continuously between a high value and a low value, an electrical load which comprises a primarily capacitive element connected in parallel with a primarily inductive element, said load providing an impedance to the flow of direct electrical current which varies in operation between a high value and a low value, said load being connected for energization through said main path by current having a minimum value, and circuit control means cooperating with the first control means for transferring said switching device promptly between said high and low values only when the current in said main path is substantially at said minimum value.

17. In a load-energizing system, first and second switching devices each having a main current path and control means operable for varying the resistance of the main current path continuously between a high value and a low value, an electrical load having an element exhibiting substantial capacitance connected in parallel with an element exhibiting substantial inductance, means connecting the load for energization through the main path of the first switching device by current flowing in a first direction, means connecting the load for energization through the main path of the second switching device by current flowing in a second direction, the current flowing to said load in either of said directions having a minimum value, and operating means cooperating with the control means for repetitively transferring each of said switching devices between said high and low values only when the current in the main path of the associated switching device is substantially at said minimum values, said operating means including phase-displacing means for establishing alternately the low resistance values in the main current paths of the switching devices.

18. The method of energizing a capacitive load from a source of unidirectional potential which comprises the steps of connecting said source of potential to said load for flow of current in a first direction, of disconnecting said source of potential subsequent to the current flow to said load reaching a predetermined magnitude, of discharging said capacitive load, of thereafter connecting said source and potential to said load in opposite polarity for flow of current in a second direction, of disconnecting said source of potential subsequent to the current flow to said load in said second direction reaching a predetermined magnitude, and of repeating said steps for the desired length of time said load is to be energized.

19. The method of alternatively energizing a capacitive load from a source of unidirectional potential which comprises the steps of connecting said source of potential to said load in one polarity, of restraining current flow from said source to said load in a first direction, of discharging said load potential while said current flow in said first direction is being restrained, of thereafter flowing current to said load in said first direction, of terminating current flow to said load in said first direction, of reconnecting said source of potential to said load in a second polarity, of restraining current flow from said source to said load in a second direction, of discharging said load potential while said current flow in said second direction is being restrained, of thereafter flowing current to said load in said second direction, of terminating current flow to said load in said second direction, and of repeating said steps for the duration of the time said load is to be energized.

20. The method of alternatingly energizing a capacitive load from a source of unidirectional potential which comprises the steps of connecting said source of potential to said load in one polarity, of restraining current flow from said source to said load in a first direction, of altering the charge across said load so that the potential thereacross is of a first polarity which is opposite in polarity to said one polarity while said current flow in said first direction is being restrained, of thereafter flowing current to said load in said first direction, of terminating current flow in said first direction subsequent to a predetermined time interval of reconnecting said source of potential to said load in another polarity, of restraining current flow from said source to said load in a second direction, of altering the charge across said load so that the potential thereacross is of a second polarity which is opposite in polarity to said other polarity while said current flow in said second direction is being restrained, of thereafter flowing current to said load in said second direction, of terminating current flow in said second direction subsequent to a predetermined time interval and of repeating said steps for a desired time interval.

References Cited in the file of this patent

UNITED STATES PATENTS

| 2,694,785 | Williams | Nov. 16, 1954 |
| 2,849,614 | Royer et al. | Aug. 26, 1958 |
| 2,873,371 | Van Allen | Feb. 10, 1959 |

FOREIGN PATENTS

| 1,018,913 | Germany | Nov. 7, 1957 |